(12) United States Patent
Heise et al.

(10) Patent No.: US 9,428,159 B2
(45) Date of Patent: Aug. 30, 2016

(54) FAIL-SAFE PARKING BRAKE FOR MOTOR VEHICLES

(75) Inventors: Andreas Heise, Erzhausen (DE); Kai Schade, Münster (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 26 days.

(21) Appl. No.: 13/880,116

(22) PCT Filed: Oct. 17, 2011

(86) PCT No.: PCT/EP2011/068065
§ 371 (c)(1),
(2), (4) Date: Jul. 8, 2013

(87) PCT Pub. No.: WO2012/052380
PCT Pub. Date: Apr. 26, 2012

(65) Prior Publication Data
US 2013/0282249 A1    Oct. 24, 2013

(30) Foreign Application Priority Data

Oct. 18, 2010 (DE) .......................... 10 2010 042 595
Oct. 14, 2011 (DE) .......................... 10 2011 084 534

(51) Int. Cl.
*B60T 7/00* (2006.01)
*B60T 7/12* (2006.01)
(Continued)

(52) U.S. Cl.
CPC . *B60T 7/12* (2013.01); *B60T 7/042* (2013.01); *B60T 7/045* (2013.01); *B60T 7/107* (2013.01); *B60T 13/588* (2013.01); *B60T 13/741* (2013.01); *B60T 13/745* (2013.01); *B60T 13/746* (2013.01); *B60T 13/748* (2013.01); *B60T 17/221* (2013.01); *B60T 2270/413* (2013.01)

(58) Field of Classification Search
CPC ....... B60T 7/12; B60T 13/745; B60T 13/746; B60T 13/741; B60T 17/221
USPC .................................. 701/22, 36, 70; 303/20
See application file for complete search history.

(56) References Cited

U.S. PATENT DOCUMENTS 6,296,325 B1 * 10/2001 Corio .................... B60T 8/1703
                                                           244/110 A
6,954,692 B2 * 10/2005 Dellac ...................... B60T 8/00
                                                           188/156

(Continued)

FOREIGN PATENT DOCUMENTS

DE        100 06 656 C1     2/2000
DE        101 50 803 A1     5/2003

(Continued)

OTHER PUBLICATIONS

PCT International Search Report—Apr. 26, 2012.
(Continued)

*Primary Examiner* — Jonathan M Dager
(74) *Attorney, Agent, or Firm* — Brinks Gilson & Lione (57) ABSTRACT

An electronic controller for a brake system of a motor vehicle, having at least one interface to a control element, in particular a parking brake control switch, and at least two drive circuits for electric parking brake actuators. The electronic controller at least two independent arithmetic units, which are directly connected to each other via a data bus. A motor vehicle equipped with a controller according to the invention requires no transmission lock in an automatic gearbox.

17 Claims, 5 Drawing Sheets

(51) Int. Cl.
*B60T 7/04* (2006.01)
*B60T 7/10* (2006.01)
*B60T 13/58* (2006.01)
*B60T 13/74* (2006.01)
*B60T 17/22* (2006.01)

(56) References Cited

U.S. PATENT DOCUMENTS

| | | | | |
|---|---|---|---|---|
| 8,752,908 | B2* | 6/2014 | Heise | B60T 7/042 303/122.04 |
| 9,227,608 | B2* | 1/2016 | Hill | B60T 8/1703 |
| 2001/0023799 | A1* | 9/2001 | Engelhard | B60T 7/107 188/151 R |
| 2001/0045771 | A1* | 11/2001 | Corio | B60T 8/1703 303/20 |
| 2003/0226727 | A1* | 12/2003 | Laurent | B60T 1/12 188/265 |
| 2004/0201270 | A1 | 10/2004 | Suzuki | |
| 2005/0127746 | A1* | 6/2005 | Braschel | 303/20 |
| 2006/0152080 | A1* | 7/2006 | Chico | B60T 7/12 303/191 |
| 2008/0121443 | A1* | 5/2008 | Clark et al. | 180/65.1 |
| 2010/0042871 | A1* | 2/2010 | Wendorff | G06F 11/16 714/11 |
| 2010/0314934 | A1* | 12/2010 | Leiter | 303/20 |
| 2012/0116696 | A1* | 5/2012 | Wank | 702/58 |
| 2012/0145490 | A1* | 6/2012 | Clary | B60T 8/1703 188/1.11 E |
| 2013/0268798 | A1* | 10/2013 | Schade | G06F 11/1487 714/3 |
| 2013/0282249 | A1* | 10/2013 | Heise | B60T 7/042 701/70 |

FOREIGN PATENT DOCUMENTS

| | | |
|---|---|---|
| DE | 10 2007 029 632 A1 | 1/2008 |
| DE | 10 2007 036 259 A1 | 2/2009 |
| DE | 10 2008 033 309 A1 | 4/2009 |
| DE | 10 2007 059 684 A1 | 6/2009 |
| DE | 197 51 431 A1 | 6/2009 |
| EP | WO 99/26818 | 6/1999 |
| EP | WO 2004/007242 A2 | 1/2004 |
| EP | 1 655 830 A1 | 5/2006 |
| EP | WO 2009/074252 A1 | 6/2009 |

OTHER PUBLICATIONS

German Examination Report—Dec. 5, 2012.
Chinese Examination Report—Jan. 8, 2015.

* cited by examiner

FAIL-SAFE PARKING BRAKE FOR MOTOR VEHICLES

CROSS REFERENCE TO RELATED APPLICATIONS

This application claims priority to German Patent Application Nos. 10 2010 042 595.8, filed Oct. 18, 2010; 10 2011 084 534.8, filed Oct. 14, 2011; and PCT/EP2011/068065, filed Oct. 17, 2011.

FIELD OF THE INVENTION

The invention relates to a motor vehicle brake system and an electronic controller for such a brake system.

BACKGROUND OF THE INVENTION

Modern motor vehicles often comprise an electric parking brake. This can be operated by the driver by means of a control switch that is connected to an electronic controller, which controls one common or two separate parking brake actuators for two wheels. For safety reasons, it is desirable that the electric parking brake operates reliably even in the event of single faults occurring.

An electromechanical parking brake system for motor vehicles is known from DE 197 51 431 A1, which comprises a brake actuating device, an electronic controller for the conversion of input signals into corresponding output signals, and two motor operated parking brakes, which can be controlled depending on output signals of the controller. In order to increase operational reliability, the electronic controller comprises two or a plurality of parallel control units for the separate processing of the input signals. Thus in the event of a defect in one of the branches, at least one parking brake can still be operated. Preferably, a backup battery for the supply of the control units and the parking brakes can be switched on by means of an additional switch. In vehicles having automatic gearboxes it is provided to use the parking lock in the gearbox to hold the vehicle instead of a backup battery in the event of an electrical fault.

Also typical vehicles having manual transmissions can ensure adequate parking on a gradient by engaging a suitable gear, which acts as a second redundant means of preventing the vehicle from rolling away besides the parking brake.

Vehicles driven by electric motors can comprise a gearbox; on the other hand there is often no gearbox because electric drives can cover a large range of revolution rates and hence a wide speed range even without gearboxes. Furthermore, modern internal combustion engines and gearboxes are frequently designed with low friction in such a way that self-locking, which would allow parking on a hill with a gear engaged, is not guaranteed. Such versions of vehicles also require a safe redundant rollaway prevention means on a hill.

A parking brake system for motor vehicles is known From DE 10 2007 029 632 A1 having a control element and at least two electromechanical actuators, each for the generation of a parking brake force on a wheel of the motor vehicle, in which the electromechanical actuators are each provided with a wheel electronic means and wherein the control element is connected by means of a control unit to the wheel electronic means of the first electromechanical actuator via a first signal line and via a second signal line by means of a further control unit to the wheel electronic means of the second electromechanical actuator. Furthermore, at least a third signal line is provided, which directly connects the control element to the wheel electronic means or to one of the electromechanical actuators respectively and transmits the driver's demand. Preferably, the third signal line is designed in such a way that it connects the control element directly to the wheel electronic means of the electromechanical actuators on the one hand and on the other hand connects the two wheel electronic means to each other and enables communications between the wheel electronic means. It is preferred if a redundant power supply is provided for the parking brake system. This ensures parking of the vehicle with a safeguard against single faults, although the parking brake system is complex and thus expensive.

The object of the present invention is to provide an alternative electric parking brake that enables fail-safe parking of the vehicle on a gradient.

This object is achieved through an electronic controller as described herein (in conjunction with a conventional control element and conventional parking brake actuators) as well as a related brake system.

INTRODUCTORY DESCRIPTION OF THE INVENTION

An electronic controller for a brake system of a motor vehicle is thus provided having at least one interface to a control element, in particular a parking brake switch, and at least two drive circuits for electric actuators, in particular electric parking brake actuators. According to the invention, the electronic controller comprises two or a plurality of independent arithmetic units, which are directly connected to each other by a data bus.

Current control elements for the parking brake comprise redundant, i.e. duplicated, switch contacts and a redundant connection to the controller. Thus fail-safe recognition of the driver's command, i.e. in particular being insensitive to the occurrence of any single fault, is guaranteed. The use of two drive circuits and two independent arithmetic units also guarantees that when an error occurs at least one actuator can still be operated. As the arithmetic units are mutually independent and are directly connected to each other via a data bus, in an emergency, either each arithmetic unit controls the actuator associated with it or one arithmetic unit controls all actuators of the parking brake. In the second case mentioned the other arithmetic unit can execute other programs to make optimal use of the available computing power and then only takes over parking brake control if an error message arrives via the data bus or if a regularly incident message about the correct operation of the other arithmetic unit does not arrive. The integration of drive circuits including power electronics in a controller ensures low manufacturing costs. Because a brake system equipped with an electronic controller according to the invention guarantees safe parking, the transmission lock can be omitted in motor vehicles having automatic gearboxes.

Advantageously, at least two independent arithmetic units each have an associated power supply, which preferably comprises at least one voltage converter and at least one fuse, in particular each comprising a battery and/or a generator. Thus even in the event of a fault in the energy supply, application of the parking brake can still take place. The required degree of redundancy can be provided here depending on the probability of a fault in the individual components.

It is advantageous if the independent arithmetic units and the data bus are integrated on a substrate, in particular a silicon chip. This enables inexpensive manufacture and— promoted by the small dimensions—rapid data transfer on the data bus with short latency times. By this means it is also possible to exchange information on the state of the vehicle, which is typically available in the controller of the brake system, between the arithmetic units. The other arithmetic unit can thus execute programs that provide e.g. comfort-oriented driver assistance functions by using suitable information. Because the data transfer between the arithmetic units takes place over the data bus, the program structure is simplified in comparison with respect running all programs on one arithmetic unit. It is particularly advantageous if other parts of the controller are also integrated on a substrate or a silicon chip, in particular the silicon chip also comprising the arithmetic units. This further reduces the production costs and enables a more compact construction of the controller.

According to a preferred embodiment of the invention, at least two of the independent arithmetic units are implemented at least partly in redundant form. As e.g. the functional groups with the highest probability of a fault are implemented as redundant, i.e. duplicated, the normal programs of the arithmetic units can continue to be executed even in the event of a single fault occurring.

According to a particularly preferred embodiment of the invention, at least one of the arithmetic units, in particular two, is implemented as a redundant core microcontroller, in particular with two processor cores operating in lockstep mode. Two processor cores operating in lockstep mode are characterized by a comparison unit connected to both processor cores, which enables the detection of individual errors. If three redundant cores and a circuit for the determination of a majority decision are used, a single error can not only be detected but also corrected.

According to another particularly preferred embodiment of the invention, at least one of the arithmetic units is in the form of a microcontroller with asynchronous redundancy, wherein two processor cores at least partly engage common devices, in particular a volatile or non-volatile memory with parity checking. Here the components having the highest probability of a fault can be implemented as redundant or duplicated. An increase in the reliability with asynchronous redundancy is thus connected to a lower cost than with core redundant microcontrollers.

According to another particularly preferred embodiment of the invention, at least one of the arithmetic units is in the form of a microcontroller protected by a watchdog counter, which implements two processes that monitor each other. Said version provides inter alia increased reliability compared to a simple microcontroller at low cost by means of the identification of endless loops.

It is advantageous if two arithmetic units are used with different high degrees of redundancy, so that e.g. safety-relevant programs are executed by a core-redundant microcontroller, while comfort functions are provided by a simple microcontroller.

Advantageously, at least two independent drive circuits for electric parking brake actuators, in particular pulse width modulation circuits and bridge circuits, are provided, each having an associated power supply, each preferably comprising at least one voltage converter and at least one fuse, in particular each comprising a battery and/or a generator. An independent power supply of the independent drive circuits further increases the reliability.

It is advantageous if at least one of the arithmetic units comprises a means of error recognition, which on the occurrence of an error outputs a signal on the data bus and/or to an error interface. This can in particular be provided by a special circuit, which in the event of a fault of the monitored arithmetic unit ensures that corresponding error or changeover signals arrive at the other arithmetic unit and/or special switches.

It is particularly advantageous if a first arithmetic unit is connected to two drive circuits for electric parking brake actuators, in particular bridge circuits, wherein a switch is disposed in the connection between the first arithmetic unit and at least one drive circuit, which is connected between a second arithmetic unit and an error interface of the first arithmetic unit. Thus in the normal situation, the first arithmetic unit controls both parking brake actuators, whereby the full computing power of the second arithmetic unit is available for executing other programs. Alternatively, the second arithmetic unit could also be switched into an energy saving mode with reduced clock frequency and/or a limitation of the function blocks supplied with current.

It is further particularly advantageous if a first arithmetic unit is connected to a first drive circuit for electric parking brake actuators and a second arithmetic unit is connected to a second drive circuit for electric parking brake actuators. Thus in the normal situation each arithmetic unit controls its associated parking brake actuator. If an error occurs in one of the arithmetic units, then at least the parking brake actuator associated with the other arithmetic unit can be applied.

It is also particularly advantageous if a first switch is disposed in the connection between the first arithmetic unit and the first drive circuit, and a second switch is disposed in the connection between the second arithmetic unit and the second drive circuit, wherein the first switch is connected to the second arithmetic unit and an error interface of the first arithmetic unit, and the second switch is connected to the first arithmetic unit and an error interface of the second arithmetic unit. As each arithmetic unit comprises a means of error recognition, which can control a switch disposed between the arithmetic unit and the associated parking brake actuator with switching signals via an error interface, the control of both parking brake actuators is ensured even in the event of a fault in one of the arithmetic units.

Preferably, the electronic controller comprises at least one acceleration sensor, at least one yaw rate sensor, and at least one interface for wheel revolution rate sensors. Said information enables driving dynamics control of the motor vehicle and traction control of the brake system.

The electronic controller preferably comprises at least one interface to an external data bus, in particular a CAN Bus or FlexRay bus. Thus an engine torque demand can be sent to the engine controller, e.g. for traction control.

Advantageously, the electronic controller comprises at least one electrically controllable hydraulic valve, at least one electric hydraulic pump, and at least one interface for pressure sensors. Said components enable electronic control of a hydraulic brake system.

Furthermore, the invention relates to a brake system for a motor vehicle, comprising a service brake on all wheels and electric parking brake actuators on at least two wheels, which comprises an electronic controller according to the invention, which is connected to the electric parking brake actuators.

According to a preferred embodiment of the brake system according to the invention, the service brake comprises at least one hydraulic brake circuit and the electronic controller provides traction control and/or driving dynamics control.

According to another preferred embodiment of the invention, the wheels of at least one axle comprise friction brakes as a service brake.

The invention also relates to a motor vehicle that is equipped with a brake system according to the invention.

Advantageously, an internal combustion engine and/or an electric motor of the motor vehicle according to the invention is/are connected via an automatic gearbox without a transmission lock to the wheels of at least one axle.

BRIEF DESCRIPTION OF THE DRAWING FIGURES

Other preferred embodiments will become apparent from the secondary claims and the following description of an example embodiment using figures.

In the figures.

DETAILED DESCRIPTION OF THE INVENTION

Figure 1:
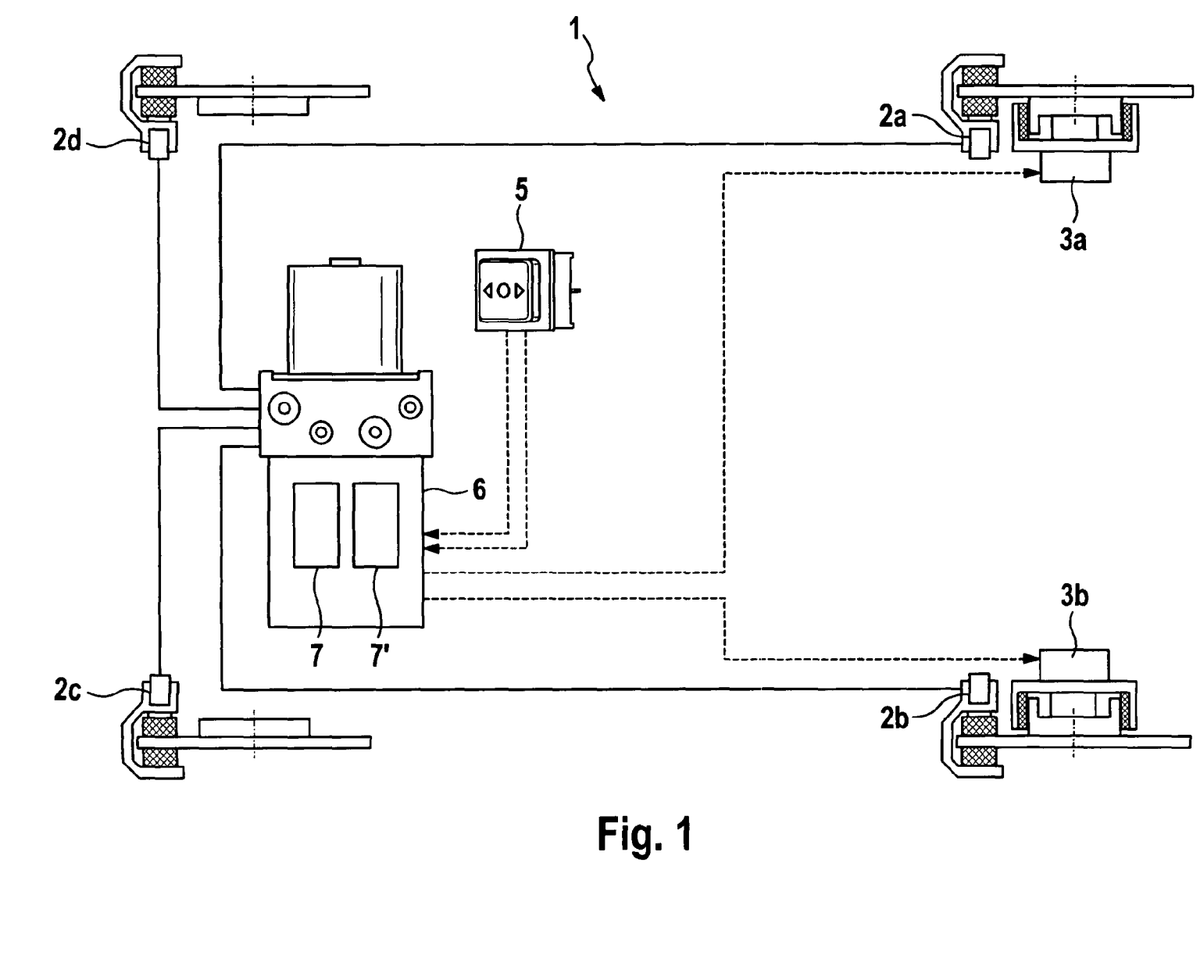
FIG. 1 shows a schematic representation of a brake system.

FIG. 1 shows in schematic form an example of a brake system 1, which is equipped with a service brake on all wheels and a parking brake on two wheels. Here the wheels of the rear axle are equipped with hydraulic friction brakes 2a, 2b and electrical parking brake actuators 3a, 3b, while the wheels of the front axle comprise only hydraulic friction brakes 2c, 2d. Both the service brake and also the parking brake are connected to an electronic controller 6, which comprises two independent arithmetic units, 7, 7' and receives a driver's command for the operation of the electric parking brake via a parking brake control switch 5.

The service brake can comprise hydraulic friction brakes or wholly or partly electromechanical brakes. The controller 6 according to the invention enables a fail-safe parking brake both with a purely hydraulic service brake and also with a combination brake, which e.g. comprises hydraulic brakes on the front axle and electromechanical friction brakes on the rear axle. If at least the wheels of one axle are equipped with hydraulic friction brakes, then the electronic controller 6 is preferably provided with solenoid valves and an electrically controlled hydraulic pump. In order to provide a traction control function and/or a driving dynamics control function of the service brake, the electronic controller 6 is preferably provided with wheel revolution rate sensors on all controlled wheels and/or at least one yaw rate sensor and a transverse acceleration sensor (the sensors are not shown in FIG. 1). The traction control and/or the driving dynamics control can be carried out by a known method, as disclosed in e.g. EP 0 792 229 B1.

The brake system 1 advantageously comprises a brake pedal (not shown), by means of which the driver can operate the service brake. The brake pedal can act upon a brake master cylinder, which causes an increase in pressure in at least one hydraulic brake circuit, with or without auxiliary power assistance, e.g. by a vacuum brake force booster. Alternatively or additionally, the brake pedal can be provided with a displacement sensor or an angle sensor. Regenerative braking can take place for an at least partly electrically driven vehicle, for which the braking torque demanded by the driver is wholly or partly built up by an electric motor in generator mode. This enables energy recovery, whereby kinetic energy of the vehicle is converted into electrical energy and e.g. stored in a battery. It is also possible to use a service brake operated by an external force and a simulator to provide a comfortable pedal feel.

In order to ensure high reliability, the electronic controller 6 comprises at least two arithmetic units 7, 7' that operate independently of each other in significant points, with which reliable operation of the entire system is ensured by suitable adaptation of the arithmetic unit, other circuit parts and control programs.

Figure 2:
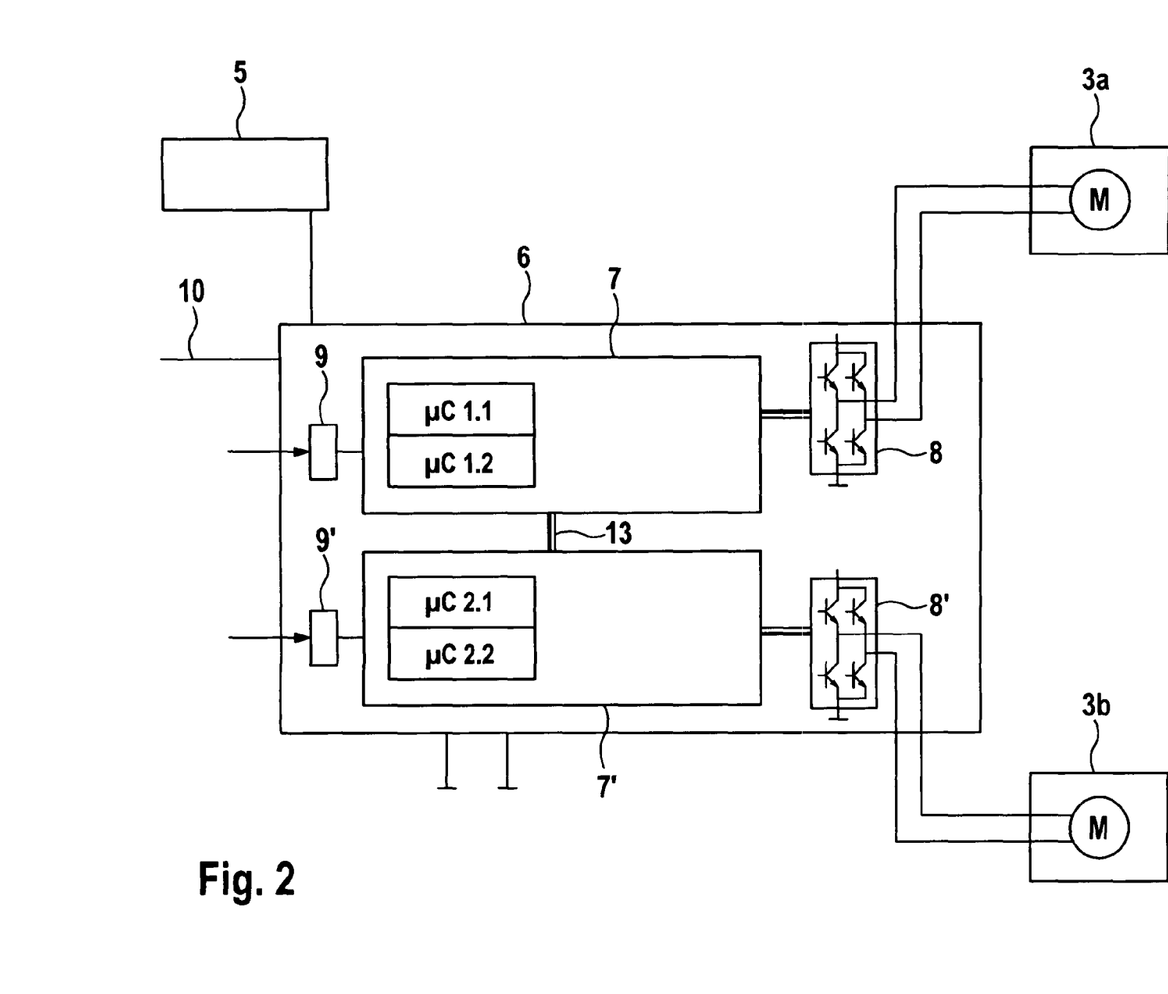
FIG. 2 shows a first example embodiment of a fail-safe parking brake.

FIG. 2 shows a first example embodiment of a fail-safe parking brake. Here, as in the following figures, elements with the same function are each provided with the same reference characters.

Preferably, control switch 5 comprises redundant switch contacts and is (as indicated in FIG. 1) connected to the electronic controller 6 via a line protected against single faults (such as e.g. two insulated wires and ground). In said example embodiment, the controller 6 comprises two redundant core microcontrollers 7, 7', each of which comprises two processor cores μC 1.1, μC 1.2 or μC 2.1, μC 2.2, which are operated in lockstep mode. This means the two processor cores each carry out the same instructions, whereupon the results are checked for agreement in a comparator. If deviations occur, then the cause of the error can be determined in an error handling routine and/or the processor cores can be re-synchronised.

The redundant core microcontrollers 7,7' are directly connected to each other via a data bus 13, to which preferably no other function blocks or external circuits are connected. This enables rapid data transfer (i.e. a high transfer rate) without long latency times (because both short signal transition times and also high possible clock rates are achieved). Each of the redundant core microcontrollers 7,7' has an associated drive circuit 8, 8' for an electric parking brake actuator 3a, 3b, in particular a bridge circuit. Thus the two arithmetic units 7,7' can control the electric motor parking brake actuator(s) 3a, 3b of a respective wheel independently of each other.

In order to be protected against power supply faults as well, the two redundant core microcontrollers 7,7' comprise an at least partly independent power supply 9,9'. Here this can be independent direct voltage converters, having in each case its own fuse, which are connected to a battery and/or a generator. Increased reliability can be achieved with two independent batteries. For vehicles with at least partial electric drive, for this purpose the drive battery can also be provided with a suitable voltage converter, which is suitably designed (according to the significantly higher voltage). Advantageously, the drive circuits 8, 8' are also connected to separate power supplies.

The electronic controller 6 preferably comprises one or a plurality of interfaces or interface components 10 for external data buses, such as CAN or FlexRay. Thus e.g. demands can be sent to an engine controller, as is useful e.g. for traction control.

If the driver demands the application or release of the parking brake via control switch 5, then the arithmetic units 7, 7' of the two wheels fitted with parking brakes synchronise themselves by means of communications via the internal data bus. Here e.g. a command for operating or releasing the parking brake is exchanged via the data bus connecting the two processors within the controller. An unimpaired or fault-free redundant core microcontroller 7, 7' directly controls the parking brake actuator associated therewith. A logical decision for operating or releasing the parking brake can be triggered by the operation of a parking brake switch or the present operating state of the vehicle, such as e.g. switching off the ignition (whereupon the parking brake is applied), or by starting (which causes the parking brake to be released, which preferably takes place depending on the operation of the gas pedal or the currently applied engine torque). Consequently the electrical or electromechanical parking brake actuators are supplied with current in parallel or with a time offset. Because the parking brake actuators have a mechanical locking function, the braking effect remains following the operation, even with no power supply.

A parking brake constructed according to the invention achieves single fault tolerance along the operating path between the control element 5, such as e.g. a parking brake sensor or switch, the controller 6 and the actuator 3a, 3b. The electromechanical parking brake actuators 3a, 3b can act upon a special friction brake such as e.g. a dual servo drum brake, which is additionally associated with a disk brake of the corresponding wheel used for the service brake, or via a suitable clamping element integrated in the brake calliper e.g. upon the brake disks of the service brake (an integrated parking brake is also referred to).

If a fault occurs in one of the arithmetic units 7, 7', then the second arithmetic unit can now operate at least the parking brake of one of its associated wheels. Thus prevention of rollaway of the vehicle can be reliably enacted, even if an arithmetic unit is faulty.

Advantageously, such a system design enables the transmission lock in automatic gearboxes to be omitted or enables safe parking capability to be enacted for electric vehicles without gearboxes and with inadequate self-locking even in the event of a single defect. For electrically driven transmission locks, the controller used for controlling or the corresponding circuit stage and the corresponding cabling can also be omitted.

Figure 3:
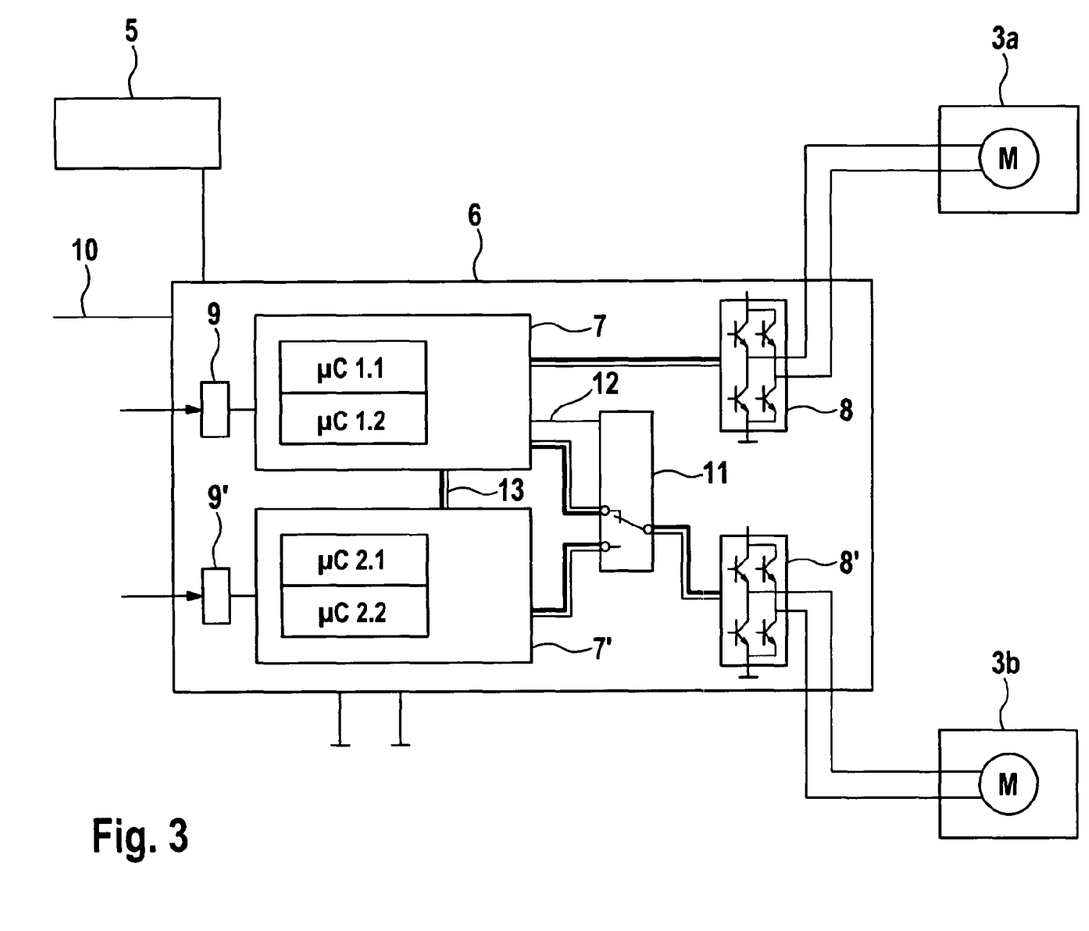
FIG. 3 shows a second example embodiment of a fail-safe parking brake.

A second example embodiment of a fail-safe parking brake is shown in FIG. 3. This is different from the embodiment shown in FIG. 2 in that a switch 11 connects the first arithmetic unit 7 to the second electrical parking brake actuator 8'. In error-free operation of the two redundant core microcontrollers the first arithmetic unit 7 controls both parking brake actuators 8, 8' directly. The second arithmetic unit 7' can execute an independent program, whereby the available computing power is used optimally and additional functions can be provided, which e.g. increase the comfort of the driver. Alternatively, the second arithmetic unit can also be clocked down or placed in a sleep mode in order to reduce power consumption. Here e.g. only reception is still taking place on the internal data bus 13 in order to receive status messages and/or error messages of the first arithmetic unit.

If a fault occurs with the first arithmetic unit 7 operating the two parking brake actuators 3a, 3b, then the second arithmetic unit 7' takes over control at least of one electrical parking brake actuator. The first arithmetic unit 7 comprises a means of fault detection for this purpose, which in the event of a fault sends a signal 12 to the switch or multiplexer 11, which connects the drive circuit of at least one actuator to the second arithmetic unit 7'. Clearly only the polarity or the level of signal 12 could be changed in order to indicate a fault. Switch 11 can also contain a circuit for detection of rising or falling edges of signal 12.

It is also advantageous in said example embodiment if in addition to the separately usable arithmetic units 7, 7' and the associated parking brake actuators 3a, 3b, a second power supply is available, which provides a reliable parking capability in the event of failures. The electrical supply of the parking brake actuators can take place by means of separate voltage sources of the two independent arithmetic units 7, 7' (in particular redundant core microcontrollers) and associated power electronics (or drive circuits) or can be implemented to allow changeover by a switch or multiplexer.

Figure 4:
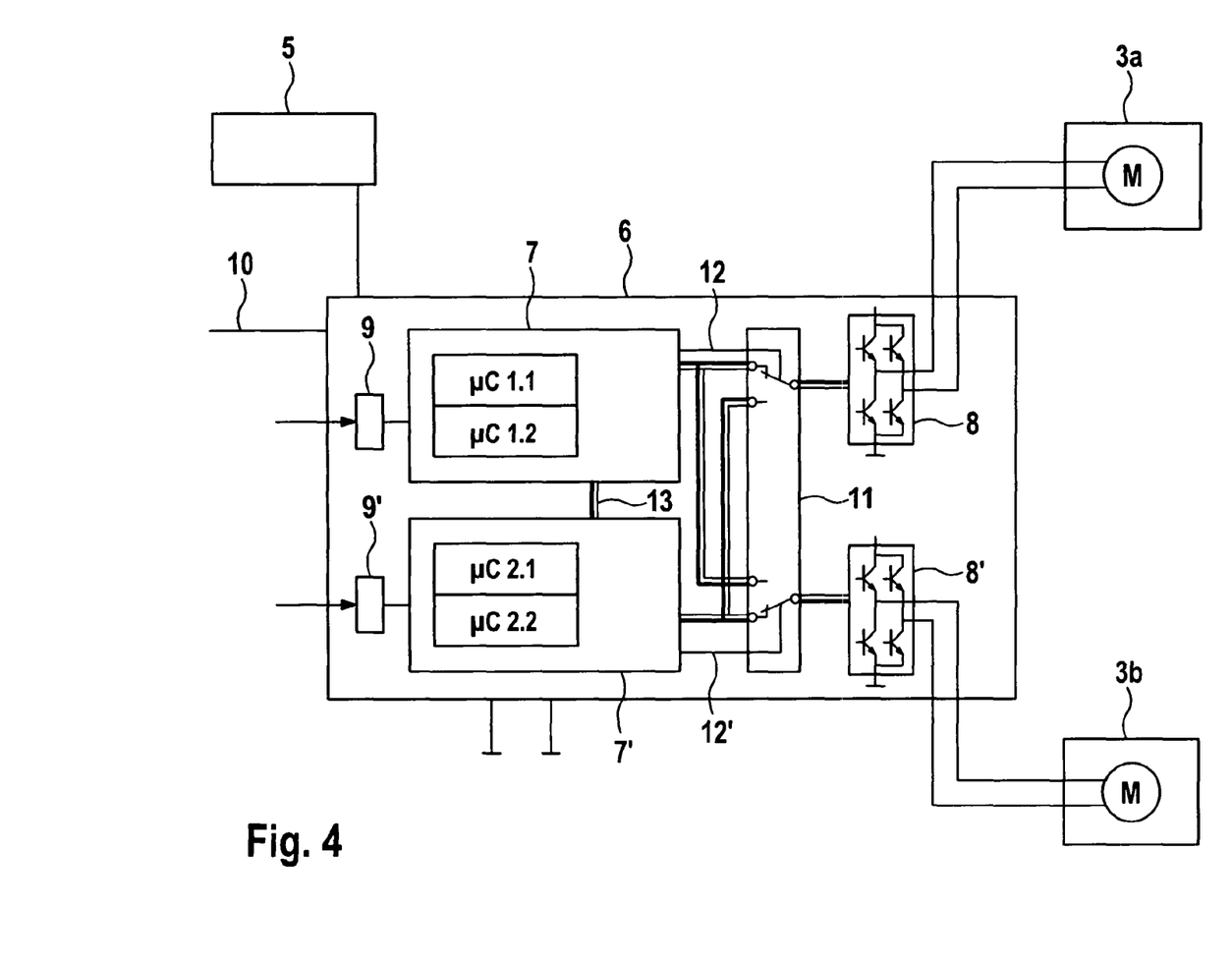
FIG. 4 shows a third example embodiment of a fail-safe parking brake.

FIG. 4 shows a third example embodiment of a fail-safe parking brake. Compared to the embodiment shown in FIG. 3, switch 11 is now designed in such a way that in each case an arithmetic unit can undertake control of the parking brake actuator of the arithmetic unit associated with the other wheel. Switch 11 can be viewed in principle as two separate switches, each of which is controlled by an error signal 12, 12' of the arithmetic unit 7, 7' normally connected to the drive circuit 8, 8'. Thus both parking brake actuators 3a, 3b can be controlled in each case by the error-free arithmetic unit (either 7 or 7').

Figure 5:
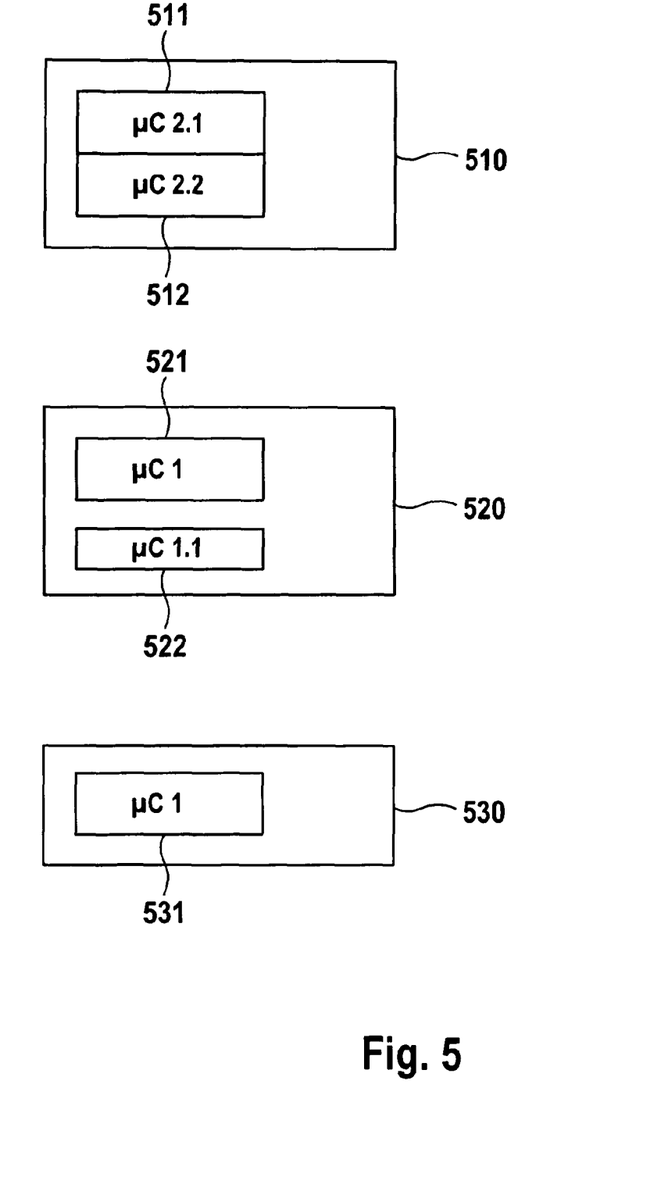
FIG. 5 shows various embodiments of at least partly redundant arithmetic units.

In FIG. 5 various embodiments of at least partly redundant arithmetic units are shown.

510 indicates two processor cores 511, 512 that are synchronous or operating in lockstep mode. Here both processor cores carry out identical instructions, and the results are checked for agreement in a comparator connected to both processor cores. When an error occurs the cause can be determined by a special error handling program and/or the impaired processor core can be brought into a defined state. In particular, it is possible following successful completion of a test routine to operate the two processor cores in lockstep mode again. A further increase in reliability is possible if three identical processor cores carry out the instructions. The "utility program" can thus be carried out without interruption even in the event of a fault (assuming a single defect). The processor cores are advantageously integrated on a substrate or chip, in principle an implementation with separate microcontrollers would also be possible. Depending on the probability of error, the processor cores can also share some devices, such as e.g. a non-volatile memory with the program data, provided they comprise suitable means of error recognition, such as e.g. a parity check.

520 indicates a microcontroller having two asynchronously operating processor cores 521, 522 that monitor each other or an architecture in which one processor core monitors the other, while this controls the external actuators. Here the same or different types of processor cores can be used. The microcontroller 520 can also only partly comprise dual structures such as processor cores and/or working memories. Other parts such as non-volatile memories and/or peripherals are protected by other security techniques such as parity checks or internal plausibility checks.

530 indicates an embodiment in which the software routines preferably running in different tasks emulate independent arithmetic units. The various software routines monitor each other; the microcontroller is externally protected by means of a watchdog counter, which must normally be reset at regular intervals in normal operation.

As the redundancy is suitably scaled depending on the probability of error and the requirements, adequate reliability can be achieved at low cost.

While the above description constitutes the preferred embodiment of the present invention, it will be appreciated that the invention is susceptible to modification, variation and change without departing from the proper scope and fair meaning of the accompanying claims.

The invention claimed is:

1. A brake system for a motor vehicle, comprising:
   a service brake on all wheels of the motor vehicle and electric parking brake actuators on at least two wheels;
   an electronic controller configured to control the service brakes and the electric parking brake actuators,
   a parking brake control switch,
   first and second drive circuits for first and second electric parking brake actuators,
   at least a first and a second independent arithmetic unit, which are directly connected to each other by means of a data bus, and the first and the second arithmetic units connected with and controlling the first and second drive circuits, the first and the second independent arithmetic units are implemented at least partly in redundant form, and the first and the second arithmetic units are in the form of a redundant core microcontroller with two processor cores working in lockstep mode, wherein the first and the second arithmetic units are entirely comprised within the electronic controller.

2. The brake system as claimed in claim 1, further comprising in that the first and the second independent arithmetic units are each associated with first and second power supplies respectively, each having at least one voltage converter, at least one fuse, and connected with a battery or a generator.

3. The brake system as claimed in claim 1 further comprising in that the first and the second independent arithmetic units and the data bus are integrated on a single substrate.

4. The brake system as claimed in claim 1 further comprising in that the first and the second arithmetic units are in the form of a microcontroller with asynchronous redundancy, wherein two processor cores at least partly access common devices having a volatile or non-volatile memory protected with parity checking.

5. The brake system as claimed in claim 1 further comprising in that the first and the second arithmetic units are in the form of a microcontroller protected by a watchdog counter which runs two processes that monitor each other.

6. The brake system as claimed in claim 1 further comprising in that the first and second drive circuits are independent pulse width modulation drive circuits for the first and second electric parking brake actuators, and each of the drive circuits is in the form of a bridge circuit, with a power supply and having at least one voltage converter and at least one fuse, and connected with a battery or a generator.

7. The brake system as claimed in claim 1 further comprising in that the first and the second arithmetic units each comprise means for error recognition, which output a signal on the data bus or to an error interface when a fault occurs.

8. The brake system as claimed in claim 7, further comprising in that the first arithmetic unit is connected to the first and the second drive circuits for the first and the second electric parking brake actuators, wherein a switch is disposed in the connection between the first arithmetic unit and at least one of the drive circuits, which is connected to the second arithmetic unit and an error interface of the first arithmetic unit.

9. The brake system as claimed in claim 7, further comprising in that the first arithmetic unit is connected to the first drive circuit for the first electric parking brake actuator and the second arithmetic unit is connected to the second drive circuit for the second electric parking brake actuator.

10. The brake system as claimed in claim 7, further comprising in that a first switch is disposed in the connection between the first arithmetic unit and the first drive circuit, and a second switch is disposed in the connection between the second arithmetic unit and the second drive circuit, wherein the first switch is connected to the second arithmetic unit and an error interface of the first arithmetic unit, and the second switch is connected to the first arithmetic unit and an error interface of the second arithmetic unit.

11. The brake system as claimed in claim 1 further comprising the electronic controller interfacing with at least one acceleration sensor, at least one yaw rate sensor, and at least one wheel revolution rate sensor.

12. The brake system as claimed in claim 1 further comprising the electronic controller connected with at least one interface to an external CAN or FlexRay bus.

13. The brake system as claimed in claim 1 further comprising the electronic controller connected with at least one electrically controllable hydraulic valve, at least one electric hydraulic pump, and at least one interface for pressure sensors.

14. The brake system as claimed in claim 1, further comprising in that the service brake comprises at least one hydraulic brake circuit and the electronic controller further provides traction control or driving dynamics control.

15. The brake system as claimed in claim 1 further comprising the service brake of the wheels of at least one axle are electromechanical friction brakes as a service brake.

16. The brake system as claimed in claim 1 implemented in a motor vehicle.

17. The brake system as claimed in claim 16, further comprising in that the motor vehicle having an internal combustion engine or an electric motor connected to the wheels of at least one axle via an automatic gearbox without a transmission lock.

* * * * *